(12) United States Patent
Lu et al.

(10) Patent No.: US 10,661,218 B2
(45) Date of Patent: May 26, 2020

(54) DEHUMIDIFICATION FRAME

(71) Applicant: Zhuhai Hermesin Enterprises CO., LTD., Guangdong (CN)

(72) Inventors: Xi Lu, Guangdong (CN); Tai Xing Yin, Guangdong (CN)

(*) Notice: Subject to any disclaimer, the term of this patent is extended or adjusted under 35 U.S.C. 154(b) by 200 days.

(21) Appl. No.: 15/984,439

(22) Filed: May 21, 2018

(65) Prior Publication Data
US 2019/0262763 A1    Aug. 29, 2019

(30) Foreign Application Priority Data

Feb. 28, 2018 (CN) ...................... 2018 2 0287432 U

(51) Int. Cl.
*B01D 53/26* (2006.01)
*B01D 53/04* (2006.01)

(52) U.S. Cl.
CPC ....... *B01D 53/0407* (2013.01); *B01D 53/261* (2013.01); *B01D 2253/102* (2013.01); *B01D 2257/80* (2013.01); *Y02W 90/11* (2015.05)

(58) Field of Classification Search
CPC .. B01D 53/04; B01D 53/0407; B01D 53/261; B01D 53/263; B01D 2253/102; B01D 2257/80; B01D 2259/4508; B01D 2259/4525; Y02W 90/11
USPC ........................ 96/117.5, 118, 119, 147, 148
See application file for complete search history.

(56) References Cited

U.S. PATENT DOCUMENTS

| 131,069 | A | * | 9/1872 | Shade | |
|---|---|---|---|---|---|
| 556,692 | A | * | 3/1896 | Purves | |
| 1,162,455 | A | * | 11/1915 | Collins | B01D 17/0208 210/265 |
| 2,341,893 | A | * | 2/1944 | Baker | F24F 3/1411 96/119 |
| 4,319,679 | A | * | 3/1982 | Gustafsson | B01D 53/261 206/0.5 |
| 4,394,144 | A | * | 7/1983 | Aoki | B01D 53/261 206/204 |
| 5,148,613 | A | * | 9/1992 | Cullen | B01D 53/261 206/204 |
| 5,215,561 | A | * | 6/1993 | Cameron | B01D 53/261 96/119 |
| 6,382,410 | B1 | * | 5/2002 | Magid | B65D 43/18 206/38.1 |
| 6,767,521 | B1 | * | 7/2004 | Vogt | A61L 9/012 206/0.5 |

(Continued)

*Primary Examiner* — Frank M Lawrence, Jr.
(74) *Attorney, Agent, or Firm* — Prakash Nama; Global IP Services, PLLC

(57) ABSTRACT

A novel dehumidification frame includes a hemispherical cover body movably connected to the top of a supporting part, the supporting part, a base movably connected to the bottom of the supporting part, and a movable rod penetrating into the hemispherical cover body, the supporting part and the base. The hemispherical cover body, the supporting part and the base can rotate around the movable rod. The invention has the advantages of being simple in structure, convenient to use and attractive in appearance. The cover body, the supporting part and the base can be opened without being disassembled. A window is further arranged so that users can observe and timely remove water absorbed by a dehumidification bag to maintain cleanliness and sanitation.

10 Claims, 9 Drawing Sheets

(56) References Cited

U.S. PATENT DOCUMENTS

2005/0217486 A1* 10/2005 Robinson ........... B01D 53/0415
  96/118
2006/0186004 A1* 8/2006 Smith ................... B23D 59/00
  206/349

* cited by examiner

US 10,661,218 B2

DEHUMIDIFICATION FRAME

BACKGROUND OF THE INVENTION

The invention relates to the field of articles of daily use, in particular to a novel dehumidification frame.

Existing dehumidification products mainly adopt particles purely, and perfume particles or bamboo charcoal is directly added into the dehumidification particles. In the dehumidification process, after the dehumidification particles absorb water, the fragrance of the perfume particles or bamboo charcoal particles is weakened, and the adsorbability of the bamboo charcoal is reduced.

As is known to all, dehumidification bags basically have to be used in cooperation with dehumidification boxes. An existing dehumidification box is essentially composed of a cover body, a supporting frame and a cavity for recovering water. However, it is generally impossible for users to observe whether the dehumidification box is full of absorbed water or not from the surface of the dehumidification box. In addition, when the water needs to be poured out, the users have to disassemble the dehumidification box extremely inconveniently with great strength.

BRIEF SUMMARY OF THE INVENTION

On account of the defects of the prior art, the invention aims to provide a novel dehumidification frame so design that a hemispherical cover body, a supporting part and a base can relatively rotate through a movable rod, and that a visual window is arranged to allow users to observe the amount of absorbed water.

To realize the above aim, the following technical scheme is adopted by the invention:

The novel dehumidification frame comprises a hemispherical cover body, a supporting part and a base. The hemispherical cover body is movably connected to the top of the supporting part. The base is movably connected to the bottom of the supporting part. The novel dehumidification frame further comprises a movable rod penetrating into the hemispherical cover body, the supporting part and the base, and the hemispherical cover body, the supporting part and the base are can rotate around the movable rod.

What needs to be pointed out is that the inner side face of the bottom of the hemispherical cover body is provided with a plurality of positioning columns, and the inner side face of the supporting part is provided with positioning grooves corresponding to the positioning columns in position and matched with the positioning columns in size.

What needs to be pointed out is that limiting strips are arranged on the periphery of the bottom of the supporting part. When the base and the supporting part are connected, the outer side faces of the limiting strips are tightly connected to the inner side face of the base.

What needs to be pointed out is that a limiting part is arranged in the base, and the bottom of the supporting part is provided with a limiting block corresponding to the limiting part in position and matched with the limiting part in size.

What needs to be pointed out is that the hemispherical cover body, the supporting part and the base are separately provided with partial slots. When the hemispherical cover body, the supporting part and the base are connected, the corresponding partial slots form a complete slot in which the movable rod is inserted.

What needs to be pointed out is that the partial slot in the base is provided with steps, and the bottom of the movable rod is provided with flanges. When the movable rod is inserted into the complete slot, the flanges and the steps are mutually limited.

What needs to be pointed out is that the base is provided with an observation window.

What needs to be pointed out is that the surface of the hemispherical cover body is provided with a plurality of holes.

What needs to be pointed out is that the supporting part is provided with a plurality of through holes.

What needs to be further pointed out is that the movable rod is slightly longer than the complete slot.

The invention has the beneficial effects of being simple in structure, convenient to use and attractive in appearance. The cover body, the supporting part and the base can be opened without being disassembled. In addition, the window is arranged so that users can observe water absorbed by the dehumidification bag and can remove the water in time to keep cleanliness and sanitation.

DETAILED DESCRIPTION OF THE INVENTION

The invention is further described with accompanying drawings as follows. What needs to be pointed out is that this embodiment shows the detailed execution mode and specific operation process based on the technical scheme, but the protection scope of the invention is not limited to this embodiment.

Figure 1:
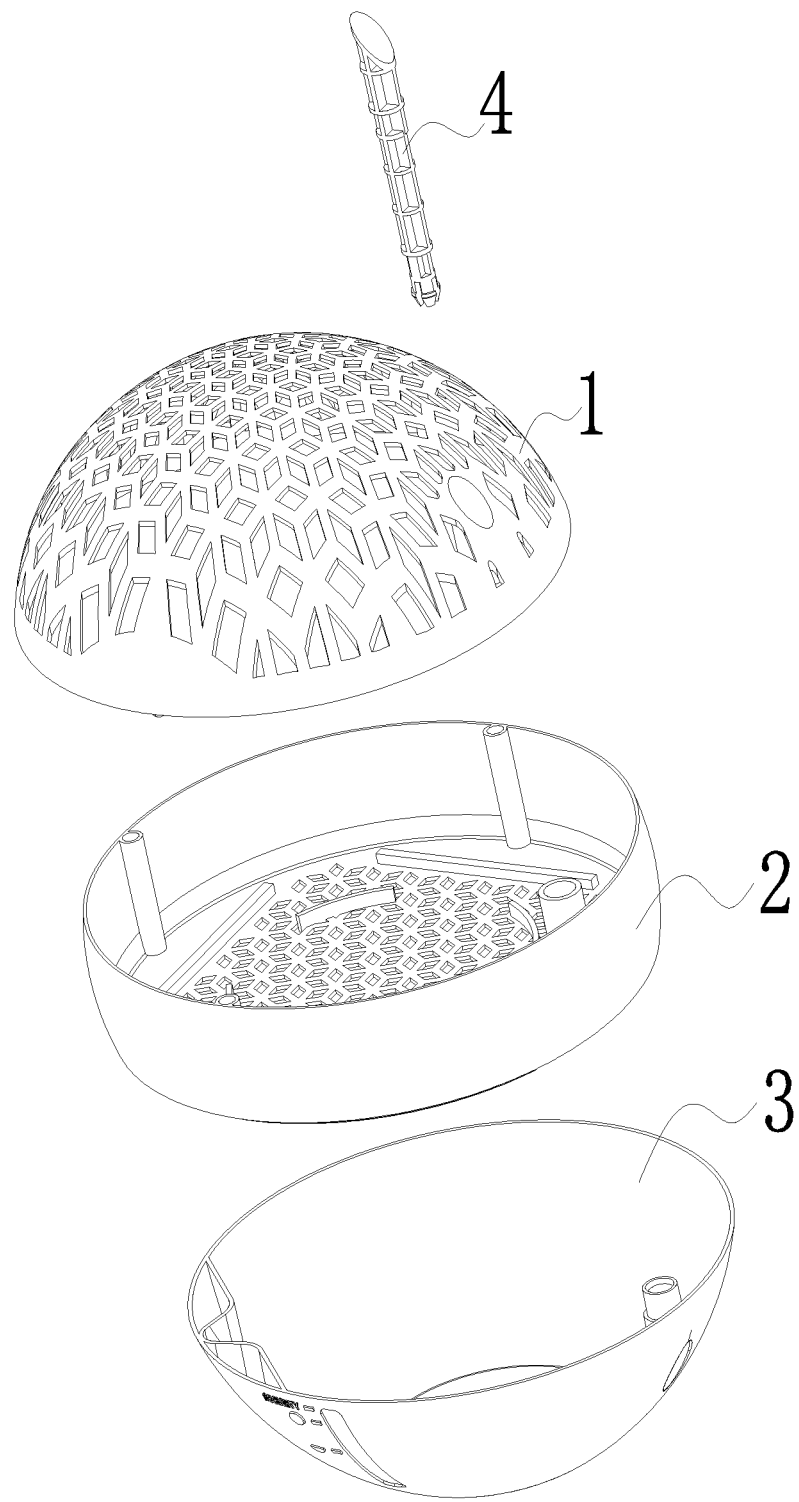
FIG. 1 is a structural diagram of the invention.

As is shown in FIG. 1, a novel dehumidification frame of the invention comprises a hemispherical cover body 1, a supporting part 2 and a base 3. The hemispherical cover body 1 is movably connected to the top of the supporting part 2. The base 3 is movably connected to the bottom of the supporting part 2. The novel dehumidification frame further comprises a movable rod 4. The movable rod 4 penetrates into the hemispherical cover body 1, the supporting part 2 and the base 3, and the hemispherical cover body 1, the supporting part 2 and the base 3 can rotate around the movable rod 4.

Figure 2:
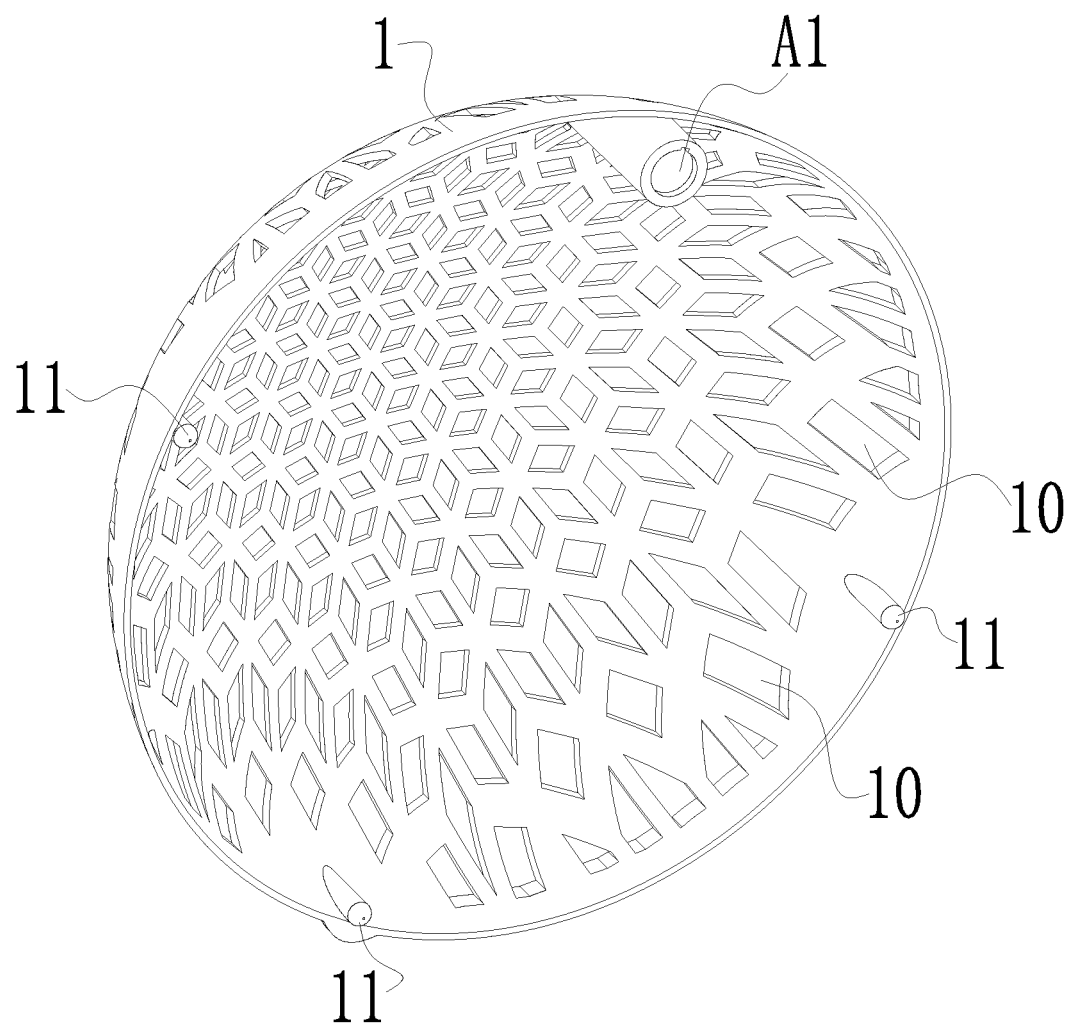
FIG. 2 is a structural diagram of a hemispherical cover body in FIG. 1.
Figure 3:
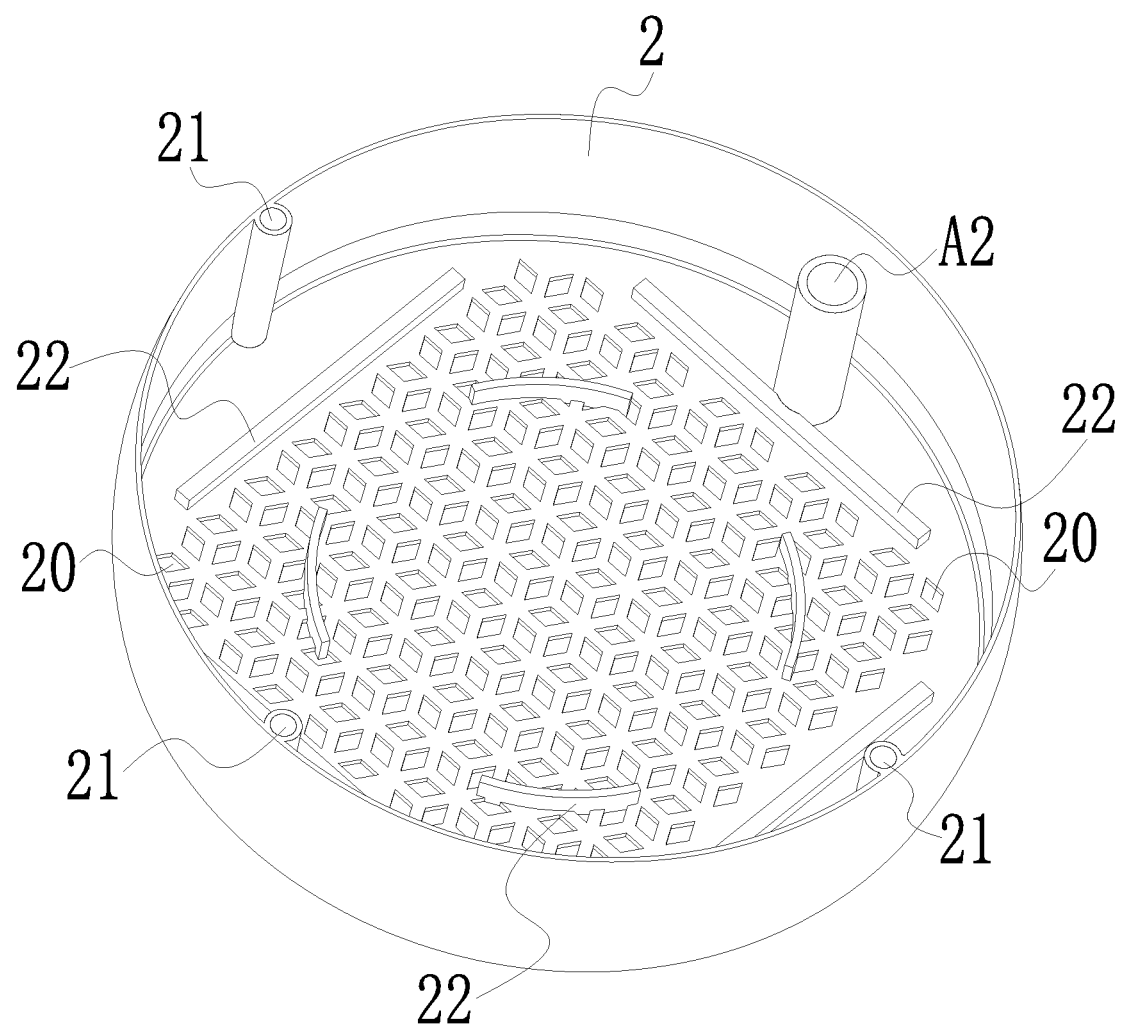
FIG. 3 is a structural diagram of a supporting part in FIG. 1.

As is shown in FIG. 2 and FIG. 3, the inner side face of the bottom of the hemispherical cover body 1 is provided with a plurality of positioning columns 11, and the inner side face of the supporting part 2 is provided with positioning grooves 21 corresponding to the positioning columns 11 in position and matched with the positioning columns 11 in size.

Figure 4:
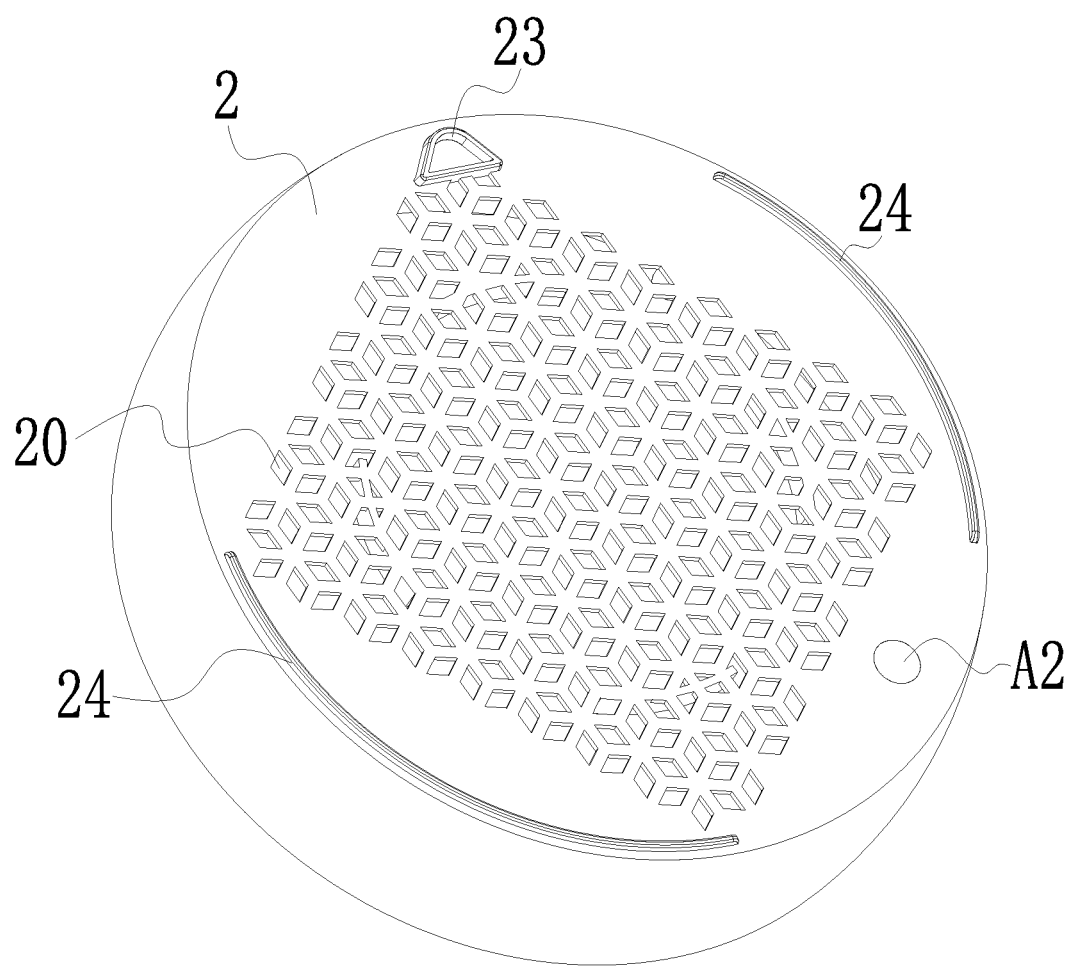
FIG. 4 is a structural diagram of a bottom in FIG. 3.
Figure 5:
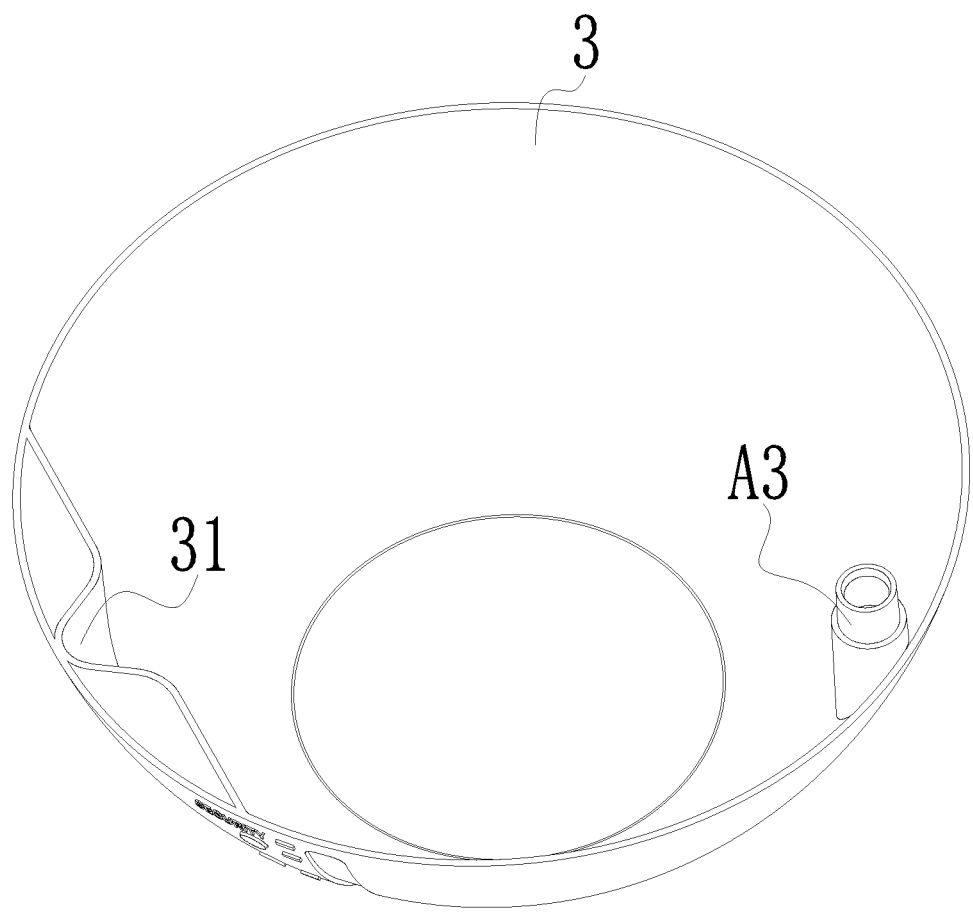
FIG. 5 is a structural diagram of a base in FIG. 1.

As is shown in FIG. 4 and FIG. 5, limiting strips 24 are arranged on the periphery of the bottom of the supporting part 2. When the base 3 and the supporting part 2 are connected, the outer side face of each limiting strip 24 is tightly connected to the inner side face of the base.

Furthermore, as is shown in FIG. 4 and FIG. 5, a limiting part 31 is arranged in the base 3. A limiting block 23 corresponding to the limiting part 31 in position and matched with the limiting part 31 in size is arranged at the bottom of the supporting part 2.

As is shown in FIGS. 2-6 and FIG. 8, the hemispherical cover body, the supporting part and the base are separately provided with a corresponding partial slot A1, a corresponding partial slot A2 and a corresponding partial slot A3. When the hemispherical cover body, the supporting part and the base are connected, the corresponding partial slot A1, the corresponding partial slot A2 and the corresponding partial slot A3 form a complete slot in which the movable rod is inserted.

Figure 7:
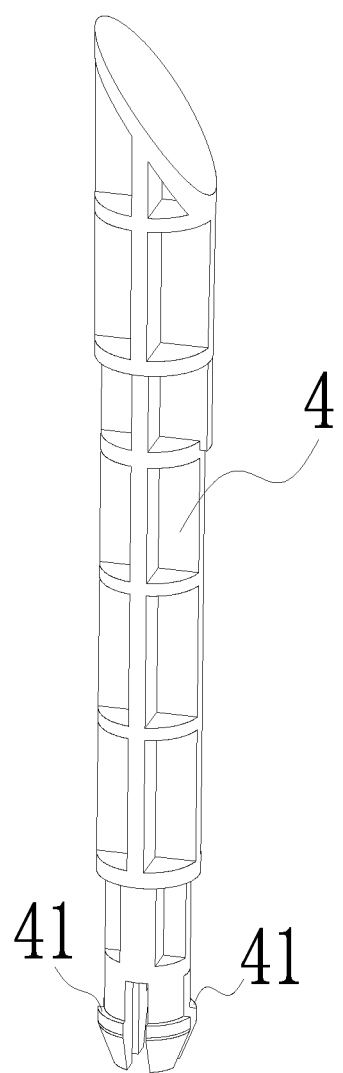
FIG. 7 is a structural diagram of a movable rod in FIG. 1.
Figure 8:
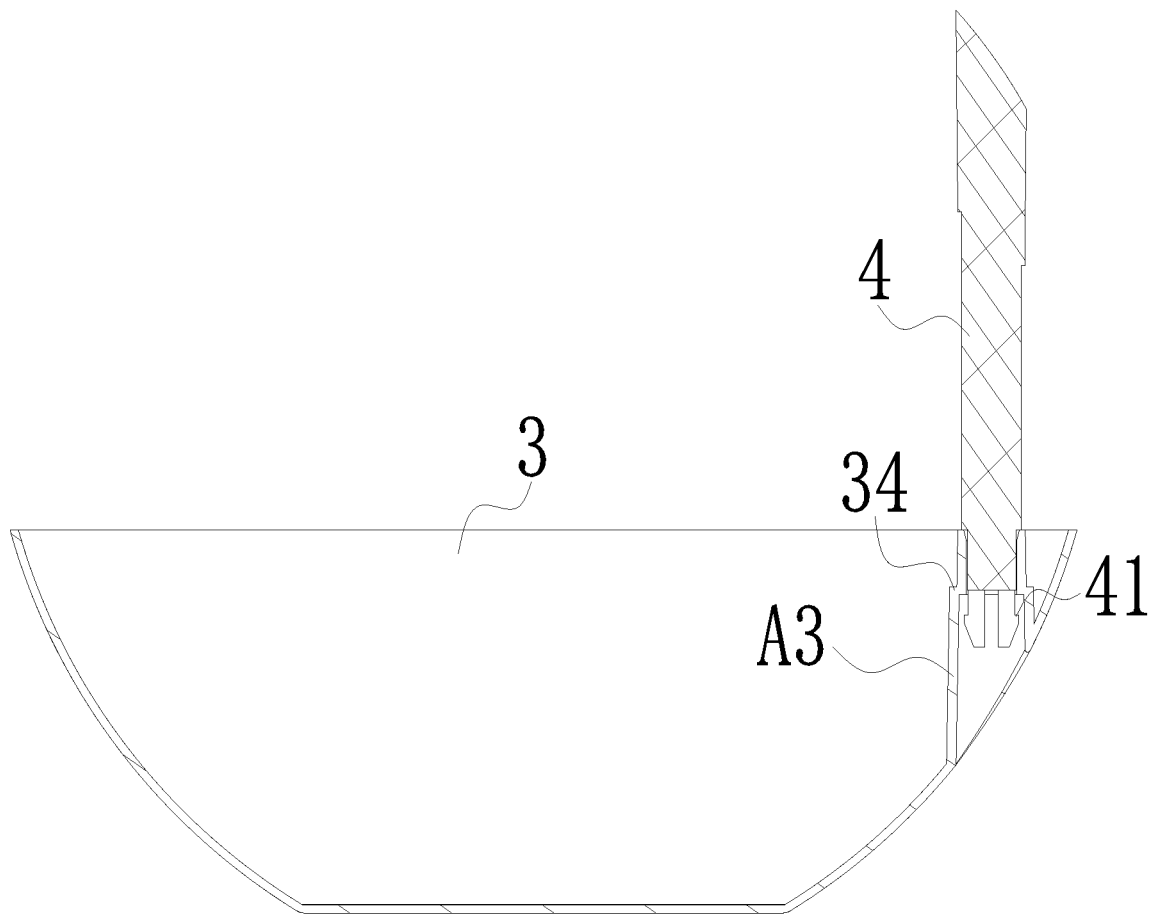
FIG. 8 is a structural section view under the condition that the movable rod and the base are connected.

As is shown in FIG. 7 and FIG. 8, the partial slot in the base 3 is provided with steps 34, and the bottom of the movable rod 4 is provided with flanges 41. When the movable rod 4 is inserted into the complete slot, the flanges 41 and the steps 34 can be mutually limited.

Figure 6:
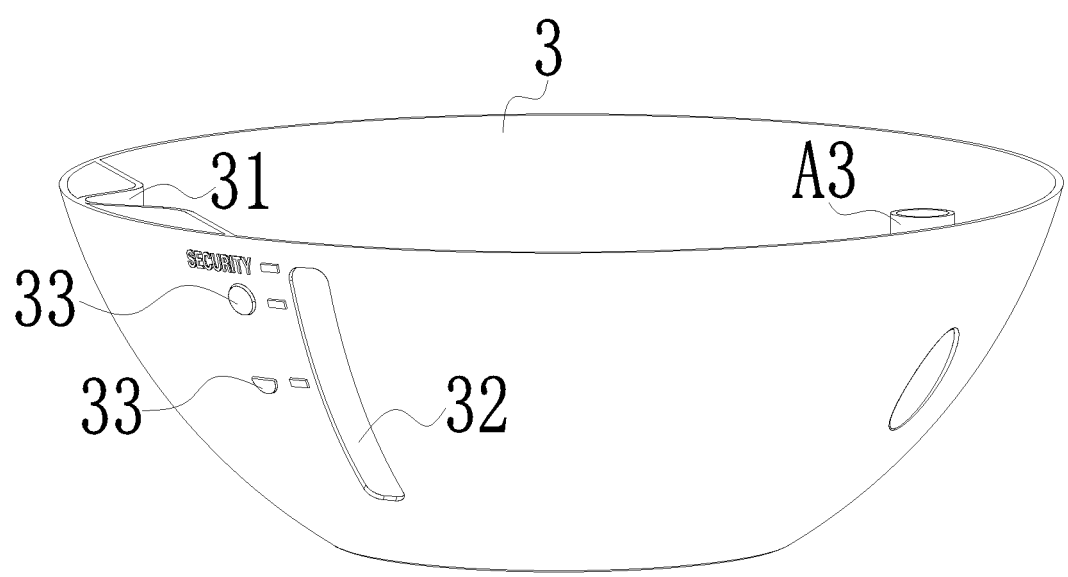
FIG. 6 is a lateral structural diagram of FIG. 5.

Furthermore, as is shown in FIG. 6, the base 3 is provided with an observation window 32. Particularly furthermore, water level warning scales 33 are arranged on one side of the observation window 32.

As is shown in FIG. 1, to enable air to make full contact with a dehumidification bag (not shown) stored in the supporting part, the surface of the hemispherical cover body 1 is provided with a plurality of holes 10.

As is shown in FIG. 2 and FIG. 3, to conveniently recover water absorbed by the dehumidification bag (not shown), the supporting part 2 is provided with a plurality of through holes 20.

As is shown in FIG. 3, the surfaces of the through holes 20 of the supporting part 2 are provided with fixing strips 22 for protecting the dehumidification bag (not shown) on the supporting part 2 against dramatic displacement when the dehumidification bag is vibrated.

What needs to be further pointed out is that to make sure the rotation of the hemispherical cover body, the supporting part and the base around the movable rod, the movable rod is slightly longer than the complete slot.

What needs to be further pointed out is that the movable rod is longer than the complete slot by over the length of the portion, inserted into the corresponding positioning groove, of each positioning column.

Figure 9:
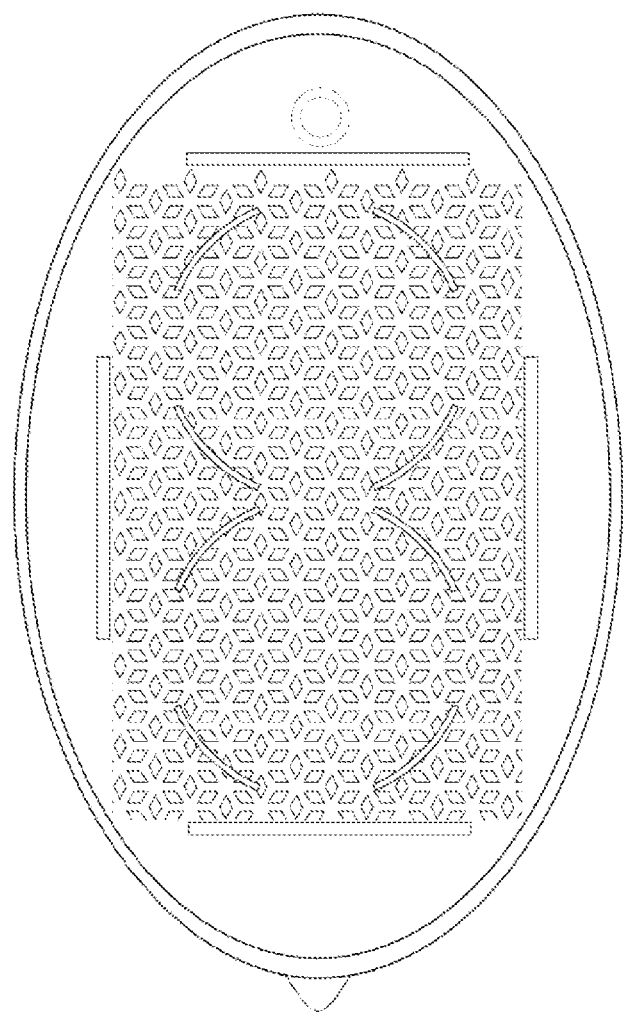
FIG. 9 is a structural diagram of another appearance shape of the invention.
Figure 10:
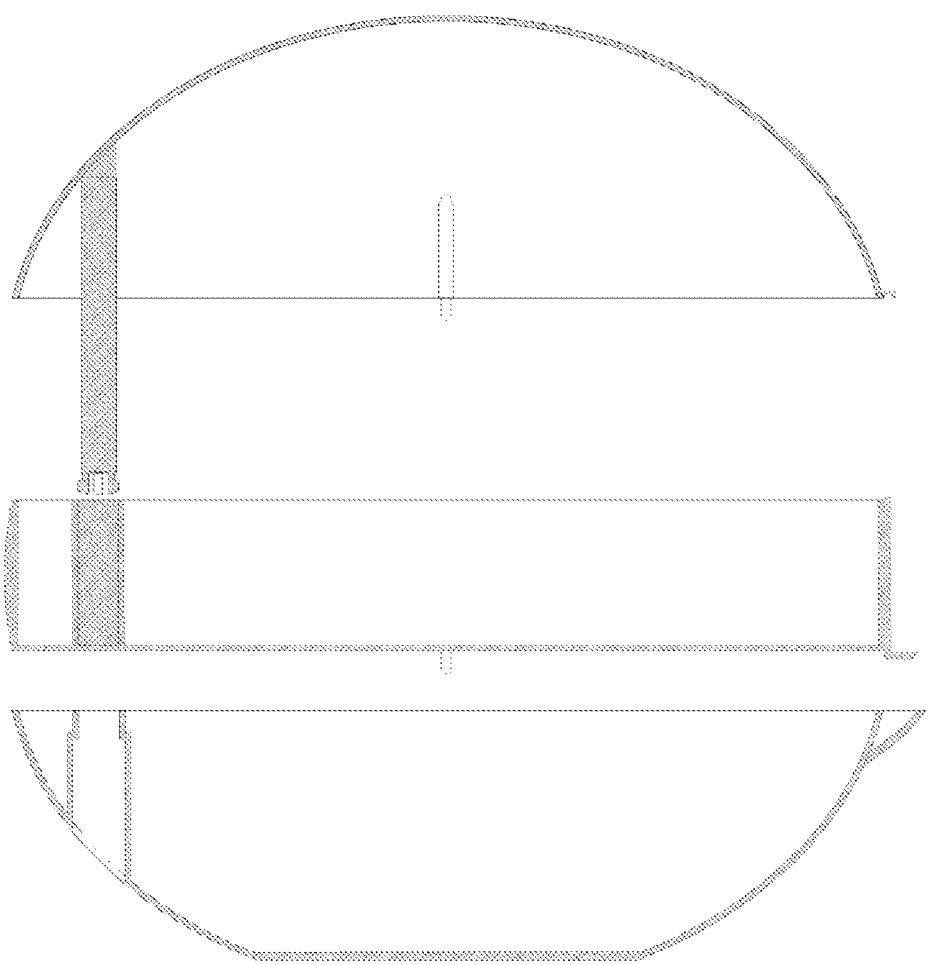
FIG. 10 is a lateral structural perspective view of another appearance shape of the invention.

Furthermore, as is shown in FIG. 9 and FIG. 10, to be more attractive or to be matched with dehumidification bags with different sizes, the appearance of the invention can also be oval.

EMBODIMENT

The dehumidification bag is placed on the supporting part first, and then the limiting block at the bottom of the supporting part and the limiting part on the base are overlapped in position and connected. As the limiting strips are arranged at the bottom of the supporting part, when the supporting part is connected to the base, the limiting strips are tightly connected to the side face of the base, thereby ensuring the tightness between the supporting part and the base. Afterwards, the positioning columns arranged on the hemispherical cover body and the positioning grooves formed in the supporting part are overlapped in position and connected, the corresponding partial slots of the hemispherical cover body, the supporting part and the base form a complete slot at this moment, and finally, the movable rod is inserted into the complete slot to complete assembly.

The hemispherical cover body can be lifted upwards to open the novel dehumidification frame. What needs to be pointed out is that as the movable rod is longer than the complete slot, a clearance for the movable rod to move up and down is available in the complete slot and is longer than portion, inserted into the corresponding positioning groove, of each positioning column. Therefore, the hemispherical cover body is separated from the supporting part to rotate around the movable rod after being lifted, and then the dehumidification bag can be taken out from the supporting part to be replaced.

Moreover, when users observe, through the window and the warning scales arranged on the base, that the base has been full of water, the hemispherical cover body and the supporting part are lifted synchronously and rotate around the movable rod according to the principle and method mentioned above, and then water in the base can be poured out.

Other various corresponding modifications and transformations can be made by those skilled in the field according to the technical scheme and concept described above, and all these modifications and transformations should fall within the scope of the claims of the invention.

What is claimed is:

1. A novel dehumidification frame, characterized by comprising a hemispherical cover body, a supporting part and a base, wherein the hemispherical cover body is movably connected to a top of the supporting part, and the base is movably connected to a bottom of the supporting part; and the novel dehumidification frame further comprises a movable rod penetrating into the hemispherical cover body, the supporting part and the base, and the hemispherical cover body, the supporting part and the base are capable of rotating around the movable rod.

2. The novel dehumidification frame according to claim 1, characterized in that an inner side face of a bottom of the hemispherical cover body is provided with a plurality of positioning columns, and an inner side face of the supporting part is provided with positioning grooves corresponding to the positioning columns in position and matched with the positioning columns in size.

3. The novel dehumidification frame according to claim 1, characterized in that limiting strips are arranged on a periphery of the bottom of the supporting part; and when the base and the supporting part are connected, outer side faces of the limiting strips are tightly connected to an inner side face of the base.

4. The novel dehumidification frame according to claim 3, characterized in that a limiting part is arranged in the base, and the bottom of the supporting part is provided with a limiting block corresponding to the limiting part in position and matched with the positioning part in size.

5. The novel dehumidification frame according to claim 1, characterized in that the hemispherical cover body, the supporting part and the base are separately provided with partial slots; and when the hemispherical cover body, the supporting part and the base are connected, the corresponding partial slots form a complete slot in which the movable rod is inserted.

6. The novel dehumidification frame according to claim 5, characterized in that the partial slot in the base is provided with steps, and a bottom of the movable rod is provided with flanges; and when the movable rod is inserted into the complete slot, the flanges and the steps are mutually limited.

7. The novel dehumidification frame according to claim 1, characterized in that the base is provided with an observation window.

8. The novel dehumidification frame according to claim 1, characterized in that the surface of the hemispherical cover body is provided with a plurality of holes.

9. The novel dehumidification frame according to of claim 1, characterized in that the supporting part is provided with a plurality of through holes.

10. The novel dehumidification frame according to claim 1, characterized in that the movable rod is slightly longer than the complete slot.

\* \* \* \* \*